United States Patent
Wu et al.

(10) Patent No.: US 9,172,880 B2
(45) Date of Patent: Oct. 27, 2015

(54) COMPUTING DEVICE AND METHOD OF IMAGE MATCHING

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xin-Yuan Wu, Shenzhen (CN); Chih-Kuang Chang, New Taipei (TW); Peng Xie, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 48 days.

(21) Appl. No.: 14/199,962

(22) Filed: Mar. 6, 2014

(65) Prior Publication Data

US 2014/0293081 A1    Oct. 2, 2014

(30) Foreign Application Priority Data

Apr. 1, 2013 (CN) .......................... 2013 1 01110377

(51) Int. Cl.
| H04N 5/228 | (2006.01) |
| H04N 7/18 | (2006.01) |
| G06K 9/00 | (2006.01) |
| H04N 5/232 | (2006.01) |
| G01B 11/16 | (2006.01) |
| G01B 11/25 | (2006.01) |
| G01C 11/18 | (2006.01) |
| G01C 11/00 | (2006.01) |

(52) U.S. Cl.
CPC .......... *H04N 5/23293* (2013.01); *G01B 11/165* (2013.01); *G01B 11/2536* (2013.01); *G01B 11/2545* (2013.01); *G01C 11/00* (2013.01); *G01C 11/18* (2013.01)

(58) Field of Classification Search
CPC ............... H04N 5/23293; G01C 11/00; G01C 11/12–11/18; G01S 17/32; G01S 17/36; G01B 11/165; G01B 11/167; G01B 11/2536; G01B 11/2545
USPC ................ 348/135, 136, 138, 222.1; 382/154
See application file for complete search history.

(56) References Cited

U.S. PATENT DOCUMENTS

| 8,363,929 | B2 * | 1/2013 | Kojima et al. ................ 382/154 |
| 2007/0009150 | A1 * | 1/2007 | Suwa et al. ................... 382/154 |
| 2010/0283847 | A1 * | 11/2010 | Aikawa et al. ................ 348/142 |
| 2010/0299103 | A1 * | 11/2010 | Yoshikawa ................... 702/167 |

* cited by examiner

*Primary Examiner* — Sinh Tran
*Assistant Examiner* — Mark Monk
(74) *Attorney, Agent, or Firm* — Novak Druce Connolly Bove + Quigg LLP

(57) ABSTRACT

A computing device is connected to a measurement device including a projector, a left camera and a right camera. The projector is controlled to project gratings with a number M of frequencies on an object. The left camera captures a number N of left grating images, and the right camera captures a number N of right grating images of the gratings with each of the frequencies. A luminous intensity of each pixel in each of the left grating images and the right grating images is computed. According to the luminous intensity of each pixel in each of the left grating images, a first phase grayscale image is obtained. According to the luminous intensity of each pixel in each of the right grating images, a second phase grayscale image is obtained. A matched image is obtained by matching the first phase grayscale image and the second phase grayscale image.

15 Claims, 4 Drawing Sheets

COMPUTING DEVICE AND METHOD OF IMAGE MATCHING

BACKGROUND

1. Technical Field

Embodiments of the present disclosure relate to image processing technology, and particularly to a computing device and a method of image matching.

2. Description of Related Art

In a structured light three-dimensional (3D) measurement system, structured light is projected on an object. An image of the object is captured by a camera. The image is encoded and matched using an image matching method. The image matching process ensures accuracy of the structured light 3D measurement system. Generally, the image matching method include a phase shifting method and a phase encoding method based on a one-dimensional sine grating, such as, a binary gray code method and a multi frequency heterodyne principle, for example. However, as a limitation of the one-dimensional sine grating, an obtained phase using the one dimensional sine grating cannot directly be used to match images.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device.

Figure 1:
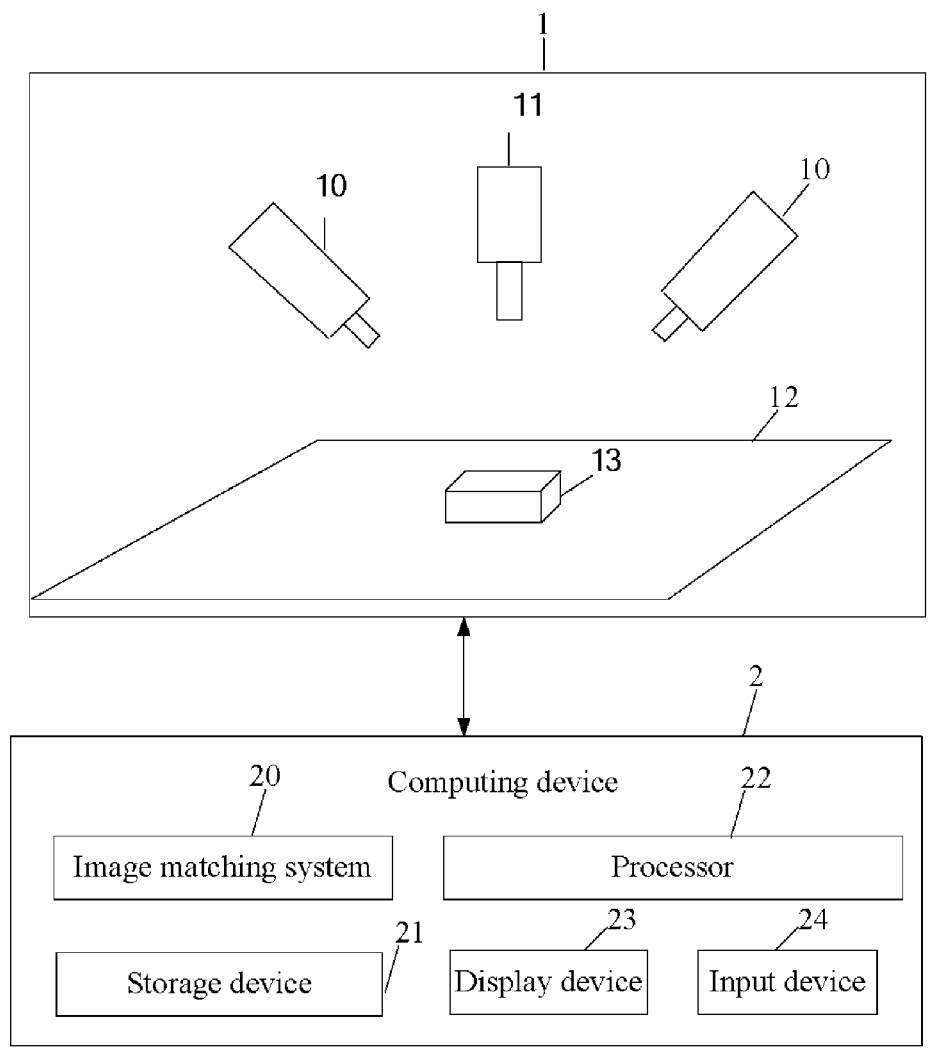
FIG. 1 is a block diagram of one embodiment of a computing device including an image matching system.

FIG. 1 is a block diagram of one embodiment of a computing device 2 including an image matching system 20 (hereinafter "the system 20"). The computing device 2 further includes a storage device 21, a processor 22, a display device 23, and an input device 24. The computing device 2 may be a computer, a smart phone or a personal digital assistant (PDA). It should be understood that FIG. 1 illustrates only one example of the computing device 2 that may include more or fewer components than illustrated, or have a different configuration of the various components in other embodiments.

The computing device 2 is connected to a measurement device 1. The measurement device 1 includes at least two cameras 10 and a projector 11. One camera 10 is positioned on the left of the projector 11 (hereinafter "the left camera") and the other camera 10 is positioned on the right of the projector 11 (hereinafter "the right camera"). The projector 11 projects gratings with a number M of frequencies on an object 13 positioned on a work table 12. The gratings generate deformations on the surface of the object 13, and the cameras 10 captures images of gratings on the object 13. The captured images are represented as grating images. The left camera captures a number N of left grating images of the gratings with each of the frequencies on the object 13. The right camera captures a number N of right grating images of the gratings with each of the frequencies on the object 13.

The system 20 obtains a first phase grayscale image according to the left grating images, and obtains a second phase grayscale image according to the right grating images. Then the system 20 obtains a matched image by matching the first phase grayscale and the second phase grayscale.

Figure 2:
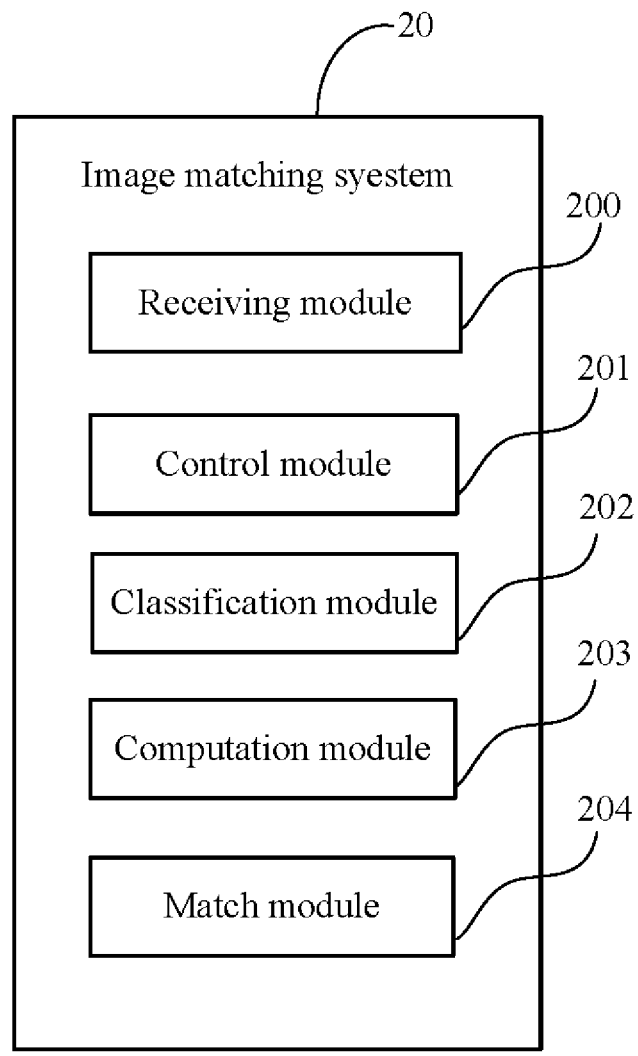
FIG. 2 is a block diagram of one embodiment of function modules of the image matching system in the computing device of FIG. 1.

FIG. 2 is a block diagram of one embodiment of function modules of the system 20. In one embodiment, the system 20 may include a receiving module 200, a control module 201, a classification module 202, a computation module 203, and a match module 204. The function modules 200-204 may include computerized codes in the form of one or more programs, which are stored in the storage device 21. The processor 22 executes the computerized codes, to provide functions of the function modules 200-204. A detailed description of the function modules 200-204 is given in reference to FIG. 3.

Figure 3:
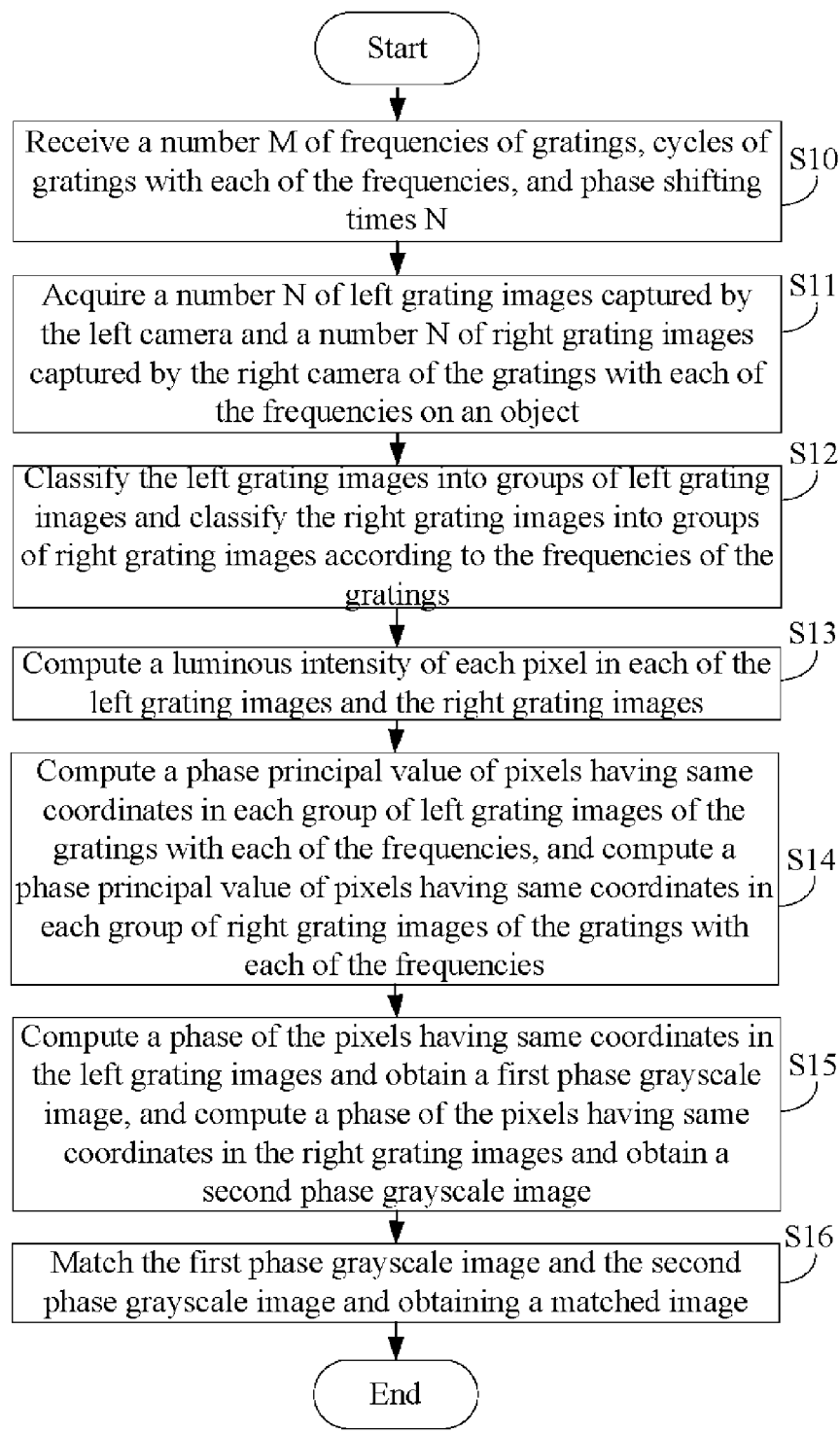
FIG. 3 illustrates a flowchart of one embodiment of a method of image matching in the computing device of FIG. 1.

FIG. 3 illustrates a flowchart of one embodiment of a method of image matching using the computing device 2 of FIG. 1. Depending on the embodiment, additional steps may be added, others removed, and the ordering of the steps may be changed.

In step S10, the receiving module 200 receives a number M of frequencies of gratings, cycles of gratings with each of the frequencies, and phase shifting times N. N represents a number of phase shifting times in an N-step phase shifting method.

In step S11, the control module 201 controls the projector 11 to project gratings on the object 13, and acquires a number N of left grating images captured by the left camera and a number N of right grating images captured by the right camera of the gratings with each of the frequencies on the object 13. For example, if M is three and N is four, for a first frequency, the left camera captures four left grating images and the right camera captures four right grating images. That is, the left camera captures M*N left grating images, and the right camera also captures M*N right grating images.

In step S12, the classification module 202 classifies the left grating images into groups of left grating images, and classifies the right grating images into groups of right grating images, according to the frequencies of the gratings. Each group of left grating images and each group of right grating images correspond to one of the frequencies.

In step S13, the computation module 203 computes luminous intensity of each pixel in each of the left grating images and the right grating images. In detail, a luminous intensity of a pixel of an $i^{th}$ grating image in a group of left grating images or a group of right grating images of a grating with a $m^{th}$ frequency is computed according to a formula as follows.

$$I_i(x, y) = a\left(1 + \cos\left(\frac{2\pi x}{\phi_m} + \frac{2(i-1)\pi}{N}\right)\right)\left(1 + \cos\left(x + \frac{2\pi y}{\phi_m} + \frac{2(i-1)\pi}{N}\right)\right).$$

In the formula, "a" represents a coefficient, "x" represents an abscissa of the pixel in the $i^{th}$ grating image, "y" represents an ordinate of the pixel in the $i^{th}$ grating image, "$\phi_m$" represents cycles of the grating with the $m^{th}$ frequency, "m" is an integer and more than zero, "i" is an integer and more than zero, and $m \le M$, $i \le N$.

In step S14, the computation module 203 computes a phase principal value of pixels having same coordinates in each group of left grating images of the gratings with each of the frequencies according to luminous intensities of the pixels having same coordinates in the group of left grating images and an N-step phase shifting method, and computes a phase principal value of pixels having same coordinates in each group of right grating images of the gratings with each of the frequencies according to luminous intensity of the pixels having same coordinates in the group of right grating images and the N-step phase shifting method.

In detail, a phase principle value $\theta(x, y)$ of pixels having same coordinates in a group of left grating images or a group of right grating images of the gratings with the $m^{th}$ frequency is computed according to a formula as follows.

$$\theta(x, y) = -\arctan\left(\frac{\sum_{i=1}^{N} I_i(x, y) \cdot \sin\left(\frac{2(i-1)\pi}{N}\right)}{\sum_{i=1}^{N} I_i(x, y) \cdot \cos\left(\frac{2(i-1)\pi}{N}\right)}\right).$$

$I_i(x, y)$ represents a luminous intensity of a pixel of the $i^{th}$ grating image in the group of the left grating images when the phase principle value $\theta(x, y)$ of the pixels having same coordinates in the group of left grating images is computed, or represents a luminous intensity of a pixel of the $i^{th}$ grating image in the group of the right grating images when the phase principle value $\theta(x, y)$ of the pixels having same coordinates in the group of right grating images is computed.

In step S15, the computation module 203 computes a phase of the pixels having same coordinates in the left grating images according to the phase principal value of the pixels having same coordinates in each group of left grating images, and obtains a first phase grayscale image according to the phase of the pixels having same coordinates in each group of left grating images. The computation module 203 also computes a phase of the pixels having same coordinates in the right grating images according to the phase principal value of the pixels having same coordinates in each group of right grating images, and obtains a second phase grayscale image according to the phase of the pixels having same coordinates in each group of right grating images.

In detail, the number M of frequencies ($\lambda_1, \lambda_2 \ldots \lambda_m \ldots \lambda_M$) are arranged according to a descending sequence. $\lambda_m$ represents a $m^{th}$ frequency, and $\lambda_M$ represents a maximum frequency of the gratings. A phase principle value of the pixels in a group of the left grating images or a right grating images of the gratings with the frequency $\lambda_m$ is represented as $\theta_m$. An absolute phase of the pixels in a group of the left grating images or a right grating images of the gratings with the frequency $\lambda_m$ is represented as $\Phi_m$. Because the first grating frequencies $\lambda_1$ is smallest, an absolute phase $\Phi_1$ of the pixels in a group of the left grating images or a right grating images of the first grating frequencies $\lambda_1$ is equal to $\theta_1$. An absolute phase $\Phi_2$ of the pixels in a group of the left grating images or a right grating images of the second grating frequencies $\lambda_2$ is computed according to the absolute phase $\Phi_1$ and the phase principle value $\theta_2$, that is, $$\Phi_2 = \theta_2 + 2\pi \cdot (INT)\left(\frac{\Phi_1 \lambda_1 / \lambda_2 - \theta_2}{2\pi}\right)^2.$$

An absolute phase $\Phi_M$ of the pixels in a group of the left grating images or a right grating images of the second grating frequencies $\lambda_M$ is computed according to a formula as follows.

$$\Phi_M = \theta_M + 2\pi \cdot (INT)\left(\frac{\Phi_{M-1} \lambda_{M-1} / \lambda_M - \theta_M}{2\pi}\right)^2.$$

The INT represents that a result of $$\text{“}\left(\frac{\Phi_{M-1} \lambda_{M-1} / \lambda_M - \theta_M}{2\pi}\right)^2\text{,”}$$

is rounded. $\Phi_{M-1}$ represents an absolute phase of the pixels in a group of the left grating images or a right grating images of the gratings with the frequency $\lambda_{M-1}$. Therefore, the phase of the pixels having same coordinates in the left grating images or the right grating images is equal to $\Phi_M$.

In step S16, the match module 204 obtains a matched image by matching the first phase grayscale image and the second phase grayscale image.

Figure 4:
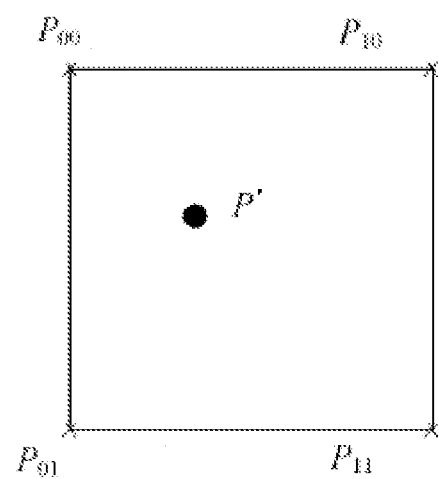
FIG. 4 is a schematic diagram of image matching using bilinear interpolation.

In detail, if a phase of a specified pixel in the first phase grayscale image is represented with $P_0$, the match module 204 determines four adjacent pixels in the second phase grayscale image for the specified pixel according to the following conditions. As show in FIG. 4, the four adjacent pixels are represented with $P_{00}$, $P_{01}$, $P_{10}$, and $P_{11}$, and $P_0 > P_{00}$, $P_0 < P_{01}$, $P_0 < P_{10}$, $P_0 < P_{11}$. Coordinates of a pixel corresponding to the phase $P_{00}$ is $(x_0, y_0)$, coordinates of a pixel corresponding to the phase $P_{01}$ is $(x_0, y_0+1)$, coordinates of a pixel corresponding to the phase $P_{10}$ is $(x_0+1, y_0)$, and coordinates of a pixel corresponding to the phase $P_{11}$ is $(x_0+1, y_0+1)$.

Then in the second phase grayscale, the match module 204 computes coordinates (x', y') of a match pixel using a bilinear interpolation method according to the four adjacent pixels in the second phase grayscale image according to formulas as follows.

$$x' = x_0 + \frac{1}{2}\left(\frac{P_0 - P_{00}}{P_{01} - P_{00}} + \frac{P_0 - P_{10}}{P_{11} - P_{10}}\right), \text{ and}$$

$$y' = y_0 + \frac{1}{2}\left(\frac{P_0 - P_{00}}{P_{10} - P_{00}} + \frac{P_0 - P_{01}}{P_{11} - P_{01}}\right).$$

It should be emphasized that the above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A computerized image matching method being executed by at least one processor of a computing device, the computing device being connected to a measurement device, the measurement device comprising a projector, a left camera, and a right camera, the method comprising:

receiving a number M of frequencies of gratings, cycles of gratings with each of the frequencies, and phase shifting times N;

controlling the projector to project gratings with each of the frequencies on an object according to the phase shifting times N, and acquiring a number N of left grating images captured by the left camera and a number N of right grating images captured by the right camera of the gratings with each of the frequencies on the object;

classifying the left grating images into groups of left grating images and classifying the right grating images into groups of right grating images according to the frequencies of the gratings, each group of left grating images and each group of right grating images corresponding to one of the frequencies;

computing a luminous intensity of each pixel in each of the left grating images and the right grating images;

computing a phase principal value of pixels having same coordinates in each group of left grating images of the gratings with each of the frequencies according to luminous intensities of the pixels having same coordinates in the group of left grating images and an N-step phase shifting method, and computing a phase principal value of pixels having same coordinates in each group of right grating images of the gratings with each of the frequencies according to luminous intensity of the pixels having same coordinates in the group of right grating images and the N-step phase shifting method;

computing a phase of the pixels having same coordinates in the left grating images according to the phase principal value of the pixels having same coordinates in each group of left grating images, and obtaining a first phase grayscale image according to the phase of the pixels having same coordinates in each group of left grating images, and computing a phase of the pixels having same coordinates in the right grating images according to the phase principal value of the pixels having same coordinates in each group of right grating images, and obtaining a second phase grayscale image according to the phase of the pixels having same coordinates in each group of right grating images;

matching the first phase grayscale image and the second phase grayscale image and obtaining a matched image.

2. The method according to claim 1, wherein a luminous intensity of a pixel of a $i^{th}$ grating image in a group of left grating images or a group of right grating images of a grating with a $m^{th}$ frequency is computed according to a formula of $$I_i(x, y) = a\left(1 + \cos\left(\frac{2\pi x}{\phi_m} + \frac{2(i-1)\pi}{N}\right)\right)\left(1 + \cos\left(x + \frac{2\pi y}{\phi_m} + \frac{2(i-1)\pi}{N}\right)\right),$$

"a" represents a coefficient, "x" represents an abscissa of the pixel in the $i^{th}$ grating image, "y" represents an ordinate of the pixel in the $i^{th}$ grating image, "$\phi_m$" represents cycles of the grating with the $m^{th}$ frequency, "m" is an integer and more than zero, "i" is an integer and more than zero, and m≤M, i≤N.

3. The method according to claim 2, wherein a phase principle value $\theta(x, y)$ of pixels having same coordinates in a group of left grating images or a group of right grating images of the gratings with the $m^{th}$ frequency is computed according to a formula of $$\theta(x, y) = -\arctan\left(\frac{\sum_{i=1}^{N} I_i(x, y) \cdot \sin\left(\frac{2(i-1)\pi}{N}\right)}{\sum_{i=1}^{N} I_i(x, y) \cdot \cos\left(\frac{2(i-1)\pi}{N}\right)}\right),$$

$I_i(x, y)$ represents a luminous intensity of a pixel of the $i^{th}$ grating image in the group of the left grating images when the phase principle value $\theta(x, y)$ of the pixels having same coordinates in the group of left grating images is computed, or represents a luminous intensity of a pixel of the $i^{th}$ grating image in the group of the right grating images when the phase principle value $\theta(x, y)$ of the pixels having same coordinates in the group of right grating images is computed.

4. The method according to claim 1, wherein a phase of the pixels having same coordinates in the left grating images or the right grating images is computed according to a formula of $$\Phi_M = \theta_M + 2\pi \cdot (\text{INT})\left(\frac{\Phi_{M-1}\lambda_{M-1}/\lambda_M - \theta_M}{2\pi}\right)^2,$$

the INT represents a result of $$\left(\frac{\Phi_{M-1}\lambda_{M-1}/\lambda_M - \theta_M}{2\pi}\right)^2$$

is rounded, a sequence of the number M of frequencies is descending, $\lambda_M$ represents a maximum frequency of gratings, $\lambda_{M-1}$ represents a $(M-1)^{th}$ frequency of the gratings, $\theta_M$ represents a phase principle value of the pixels in a group of the left grating images or a right grating images of the gratings with the frequencies $\lambda_M$, $\Phi_{M-1}$ represents an absolute phase of the pixels in a group of the left grating images or a right grating images of the gratings with the frequency $\lambda_{M-1}$, $\Phi_M$ represents an absolute phase of the pixels in a group of the left grating images or a right grating images of the gratings with the frequency $\lambda_M$.

5. The method according to claim 1, wherein the step of matching the first phase grayscale image and the second phase grayscale image anc obtaining the matched image comprises:

obtaining four adjacent pixels in the second phase grayscale image for a pixel in the first phase grayscale image, a phase of the pixel being represented with $P_0$, phases of the four pixels being represented with $P_{00}$, $P_{01}$, $P_{10}$, and $P_{11}$, and $P_0 > P_{00}$, $P_0 < P_{01}$, $P_0 < P_{10}$, $P_0 < P_{11}$, coordinates of a pixel corresponding to the phase $P_{00}$ being $(x_0, y_0)$, coordinates of a pixel corresponding to the phase $P_{01}$ being $(x_0, y_0 + 1)$, coordinates of a pixel corresponding to the phase $P_{10}$ being $(x_0 + 1, y_0)$, coordinates of a pixel corresponding to the phase $P_{11}$ being $(x_0 + 1, y_0 + 1)$;

computing coordinates $(x', y')$ of a match pixel using a bilinear interpolation method according to the four adjacent pixels in the second phase grayscale image according to formulas of $$x' = x_0 + \frac{1}{2}\left(\frac{P_0 - P_{00}}{P_{01} - P_{00}} + \frac{P_0 - P_{10}}{P_{11} - P_{10}}\right), \text{ and}$$

-continued $$y' = y_0 + \frac{1}{2}\left(\frac{P_0 - P_{00}}{P_{10} - P_{00}} + \frac{P_0 - P_{01}}{P_{11} - P_{01}}\right).$$

6. A computing device, comprising:

a processor;

and a storage device that stores one or more programs, when executed by the at least one processor, cause the at least one processor to perform an image matching method, the computing device being connected to a measurement device, the measurement device comprising a projector, a left camera, and a right camera, the method comprising:

receiving a number M of frequencies of gratings, cycles of gratings with each of the frequencies, and phase shifting times N;

controlling the projector to project gratings with each of the frequencies on an object according to the phase shifting times N, and acquiring a number N of left grating images captured by the left camera and a number N of right grating images captured by the right camera of the gratings with each of the frequencies on the object;

classifying the left grating images into groups of left grating images and classifying the right grating images into groups of right grating images according to the frequencies of the gratings, each group of left grating images and each group of right grating images corresponding to one of the frequencies;

computing a luminous intensity of each pixel in each of the left grating images and the right grating images;

computing a phase principal value of pixels having same coordinates in each group of left grating images of the gratings with each of the frequencies according to luminous intensities of the pixels having same coordinates in the group of left grating images and an N-step phase shifting method, and computing a phase principal value of pixels having same coordinates in each group of right grating images of the gratings with each of the frequencies according to luminous intensity of the pixels having same coordinates in the group of right grating images and the N-step phase shifting method;

computing a phase of the pixels having same coordinates in the left grating images according to the phase principal value of the pixels having same coordinates in each group of left grating images, and obtaining a first phase grayscale image according to the phase of the pixels having same coordinates in each group of left grating images, and computing a phase of the pixels having same coordinates in the right grating images according to the phase principal value of the pixels having same coordinates in each group of right grating images, and obtaining a second phase grayscale image according to the phase of the pixels having same coordinates in each group of right grating images;

matching the first phase grayscale image and the second phase grayscale image and obtaining a matched image.

7. The computing device according to claim 6, wherein a luminous intensity of a pixel of a $i^{th}$ grating image in a group of left grating images or a group of right grating images of a grating with a $m^{th}$ frequency is computed according to a formula of $$I_i(x, y) = a\left(1 + \cos\left(\frac{2\pi x}{\phi_m} + \frac{2(i-1)\pi}{N}\right)\right)\left(1 + \cos\left(x + \frac{2\pi y}{\phi_m} + \frac{2(i-1)\pi}{N}\right)\right),$$

"a" represents a coefficient, "x" represents an abscissa of the pixel in the $i^{th}$ grating image, "y" represents an ordinate of the pixel in the $i^{th}$ grating image, "$\phi_m$" represents cycles of the grating with the $m^{th}$ frequency, "m" is an integer and more than zero, "i" is an integer and more than zero, and m≤M, i≤N.

8. The computing device according to claim 7, wherein a phase principle value θ(x, y) of pixels having same coordinates in a group of left grating images or a group of right grating images of the gratings with the $m^{th}$ frequency is computed according to a formula of $$\theta(x, y) = -\arctan\left(\frac{\sum_{i=1}^{N} I_i(x, y) \cdot \sin\left(\frac{2(i-1)\pi}{N}\right)}{\sum_{i=1}^{N} I_i(x, y) \cdot \cos\left(\frac{2(i-1)\pi}{N}\right)}\right),$$

$I_i(x, y)$ represents a luminous intensity of a pixel of the $i^{th}$ grating image in the group of the left grating images when the phase principle value θ(x, y) of the pixels having same coordinates in the group of left grating images is computed, or represents a luminous intensity of a pixel of the $i^{th}$ grating image in the group of the right grating images when the phase principle value θ(x, y) of the pixels having same coordinates in the group of right grating images is computed.

9. The computing device according to claim 6, a phase of the pixels having same coordinates in the left grating images or the right grating images is computed according to a formula of $$\Phi_M = \theta_M + 2\pi \cdot (\text{INT})\left(\frac{\Phi_{M-1}\lambda_{M-1}/\lambda_M - \theta_M}{2\pi}\right)^2,$$

the INT represents a result of $$\left.\left(\frac{\Phi_{M-1}\lambda_{M-1}/\lambda_M - \theta_M}{2\pi}\right)^2\right."$$

is rounded, a sequence of the number M of frequencies is descending, $\lambda_M$ represents a maximum frequency of gratings, $\lambda_{M-1}$ represents a (M-1)$^{th}$ frequency of the gratings, $\theta_M$ represents a phase principle value of the pixels in a group of the left grating images or a right grating images of the gratings with the frequencies $\lambda_M$, $\Phi_{M-1}$ represents an absolute phase of the pixels in a group of the left grating images or a right grating images of the gratings with the frequency $\lambda_{M-1}$, $\Phi_M$ represents an absolute phase of the pixels in a group of the left grating images or a right grating images of the gratings with the frequency $\lambda_M$.

10. The computing device according to claim 6, wherein the step of matching the first phase grayscale image and the second phase grayscale image and obtaining the matched image comprises:

obtaining four adjacent pixels in the second phase grayscale image for a pixel in the first phase grayscale image, a phase of the pixel being represented with $P_0$, phases of the four pixels being represented with $P_{00}$, $P_{01}$, $P_{10}$, and $P_{11}$, and $P_0 > P_{00}$, $P_0 < P_{01}$, $P_0 < P_{10}$, $P_0 < P_{11}$, coordinates of a pixel corresponding to the phase $P_{00}$ being $(x_0, y_0)$, coordinates of a pixel corresponding to the phase $P_{01}$ being $(x_0, y_0+1)$, coordinates of a pixel corresponding to the phase $P_{10}$ being $(x_0+1, y_0)$, coordinates of a pixel corresponding to the phase $P_{11}$ being $(x_0+1, y_0+1)$;

computing coordinates (x', y') of a match pixel using a bilinear interpolation method according to the four adjacent pixels in the second phase grayscale image according to formulas of $$x' = x_0 + \frac{1}{2}\left(\frac{P_0 - P_{00}}{P_{01} - P_{00}} + \frac{P_0 - P_{10}}{P_{11} - P_{10}}\right), \text{ and}$$

$$y' = y_0 + \frac{1}{2}\left(\frac{P_0 - P_{00}}{P_{10} - P_{00}} + \frac{P_0 - P_{01}}{P_{11} - P_{01}}\right).$$

11. A non-transitory storage medium having stored thereon instructions that, when executed by a processor of a computing device, the computing device being connected to a measurement device, the measurement device comprising a projector, a left camera, and a right camera, causes the processor to perform an image matching method in the computing device, wherein the method comprises:

receiving a number M of frequencies of gratings, cycles of gratings with each of the frequencies, and phase shifting times N;

controlling the projector to project gratings with each of the frequencies on an object according to the phase shifting times N, and acquiring a number N of left grating images captured by the left camera and a number N of right grating images captured by the right camera of the gratings with each of the frequencies on the object;

classifying the left grating images into groups of left grating images and classifying the right grating images into groups of right grating images according to the frequencies of the gratings, each group of left grating images and each group of right grating images corresponding to one of the frequencies;

computing a luminous intensity of each pixel in each of the left grating images and the right grating images;

computing a phase principal value of pixels having same coordinates in each group of left grating images of the gratings with each of the frequencies according to luminous intensities of the pixels having same coordinates in the group of left grating images and an N-step phase shifting method, and computing a phase principal value of pixels having same coordinates in each group of right grating images of the gratings with each of the frequencies according to luminous intensity of the pixels having same coordinates in the group of right grating images and the N-step phase shifting method;

computing a phase of the pixels having same coordinates in the left grating images according to the phase principal value of the pixels having same coordinates in each group of left grating images, and obtaining a first phase grayscale image according to the phase of the pixels having same coordinates in each group of left grating images, and computing a phase of the pixels having same coordinates in the right grating images according to the phase principal value of the pixels having same coordinates in each group of right grating images, and obtaining a second phase grayscale image according to the phase of the pixels having same coordinates in each group of right grating images;

matching the first phase grayscale image and the second phase grayscale image and obtaining a matched image.

12. The non-transitory storage medium according to claim 11, wherein a luminous intensity of a pixel of a $i^{th}$ grating image in a group of left grating images or a group of right grating images of a grating with a $m^{th}$ frequency is computed according to a formula of $$I_i(x, y) = a\left(1 + \cos\left(\frac{2\pi x}{\phi_m} + \frac{2(i-1)\pi}{N}\right)\right)\left(1 + \cos\left(x + \frac{2\pi y}{\phi_m} + \frac{2(i-1)\pi}{N}\right)\right),$$

"a" represents a coefficient, "x" represents an abscissa of the pixel in the $i^{th}$ grating image, "y" represents an ordinate of the pixel in the $i^{th}$ grating image, "$\phi_m$" represents cycles of the grating with the $m^{th}$ frequency, "m" is an integer and more than zero, "i" is an integer and more than zero, and m≤M, i≤N.

13. The non-transitory storage medium according to claim 12, wherein a phase principle value $\theta(x, y)$ of pixels having same coordinates in a group of left grating images or a group of right grating images of the gratings with the $m^{th}$ frequency is computed according to a formula of $$\theta(x, y) = -\arctan\left(\frac{\sum_{i=1}^{N} I_i(x, y) \cdot \sin\left(\frac{2(i-1)\pi}{N}\right)}{\sum_{i=1}^{N} I_i(x, y) \cdot \cos\left(\frac{2(i-1)\pi}{N}\right)}\right),$$

$I_i(x,y)$ represents a luminous intensity of a pixel of the $i^{th}$ grating image in the group of the left grating images when the phase principle value $\theta(x, y)$ of the pixels having same coordinates in the group of left grating images is computed, or represents a luminous intensity of a pixel of the $i^{th}$ grating image in the group of the right grating images when the phase principle value $\theta(x, y)$ of the pixels having same coordinates in the group of right grating images is computed.

14. The non-transitory storage medium according to claim 11, wherein a phase of the pixels having same coordinates in the left grating images or the right grating images is computed according to a formula of $$\Phi_M = \theta_M + 2\pi \cdot (\text{INT})\left(\frac{\Phi_{M-1}\lambda_{M-1}/\lambda_M - \theta_M}{2\pi}\right)^2,$$

the INT represents a result of $$\left(\frac{\Phi_{M-1}\lambda_{M-1}/\lambda_M - \theta_M}{2\pi}\right)^{2''}$$

is rounded, a sequence of the number M of frequencies is descending, $\lambda_M$ represents a maximum frequency of gratings, $\lambda_{M-1}$ represents a $(M-1)^{th}$ frequency of the gratings, $\theta_M$ represents a phase principle value of the pixels in a group of the left grating images or a right grating images of the gratings with the frequencies $\lambda_M$, $\Phi_{M-1}$ represents an absolute phase of the pixels in a group of the left grating images or a right grating images of the gratings with the frequency $\lambda_{M-1}$, $\Phi_M$ represents an absolute phase of the pixels in a group of the left grating images or a right grating images of the gratings with the frequency $\lambda_M$.

15. The non-transitory storage medium according to claim 11, wherein the step of matching the first phase grayscale image and the second phase grayscale image and obtaining the matched image comprises:

obtaining four adjacent pixels in the second phase grayscale image for a pixel in the first phase grayscale image, a phase of the pixel being represented with $P_0$, phases of the four pixels being represented with $P_{00}$, $P_{01}$, $P_{10}$, and $P_{11}$, and $P_0 > P_{00}$, $P_0 < P_{01}$, $P_0 < P_{10}$, $P_0 < P_{11}$, coordinates of a pixel corresponding to the phase $P_{00}$ being $(x_0, y_0)$, coordinates of a pixel corresponding to the phase $P_{01}$ being $(x_0, y_0 +1)$, coordinates of a pixel corresponding to the phase $P_{10}$ being $(x_0 +1, y_0)$, coordinates of a pixel corresponding to the phase $P_{11}$ being $(x_0 +1, y_0 +1)$;

computing coordinates $(x', y')$ of a match pixel using a bilinear interpolation method according to the four adjacent pixels in the second phase grayscale image according to formulas of $$x' = x_0 + \frac{1}{2}\left(\frac{P_0 - P_{00}}{P_{01} - P_{00}} + \frac{P_0 - P_{10}}{P_{11} - P_{10}}\right), \text{ and}$$

$$y' = y_0 + \frac{1}{2}\left(\frac{P_0 - P_{00}}{P_{10} - P_{00}} + \frac{P_0 - P_{01}}{P_{11} - P_{01}}\right).$$

* * * * *